(No Model.)

F. W. BENTALL.
TEA POT AND STRAINER.

No. 545,936. Patented Sept. 10, 1895.

Witnesses.
Benjamin Clark.
James Fleming

Inventor,
Frank William Bentall.
per E. Eaton.
His attorney

UNITED STATES PATENT OFFICE.

FRANK WILLIAM BENTALL, OF LONDON, ENGLAND.

TEAPOT AND STRAINER.

SPECIFICATION forming part of Letters Patent No. 545,936, dated September 10, 1895.

Application filed January 21, 1895. Serial No. 535,678. (No model.) Patented in England December 3, 1894, No. 23,479.

*To all whom it may concern:*

Be it known that I, FRANK WILLIAM BENTALL, a subject of the Queen of Great Britain, and a resident of Castle Headingham, London, in the county of Essex, England, have invented certain new and useful Improvements in Teapots and Strainers or Infusers, (for which I have applied for a patent in Great Britain, No. 23,479, dated December 3, 1894,) of which the following is a full, clear, and exact specification thereof.

This invention relates to an infuser or strainer and a teapot for use with same, and aims to provide a strainer which may be readily removed from the teapot, when desired, by the lid of the teapot, and the same is carried out as follows, reference being had to the annexed drawings, in which—

Figure 1:
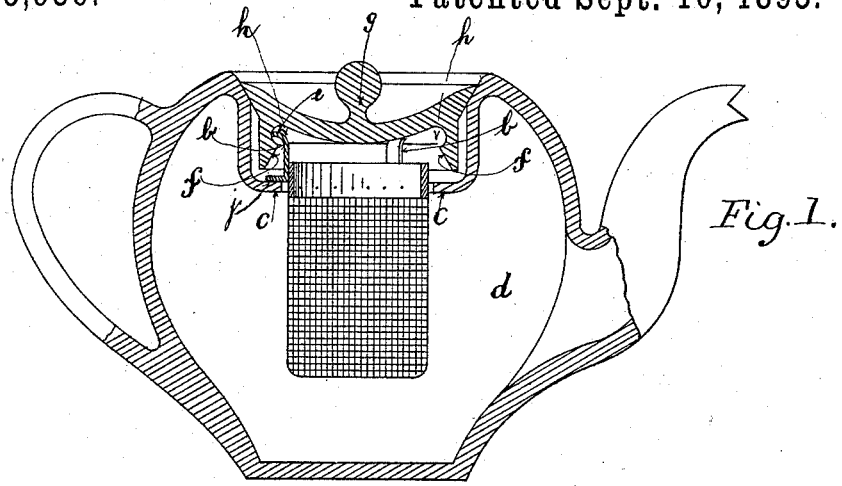
Figure 2:
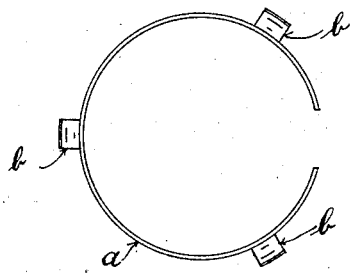
Figure 3:
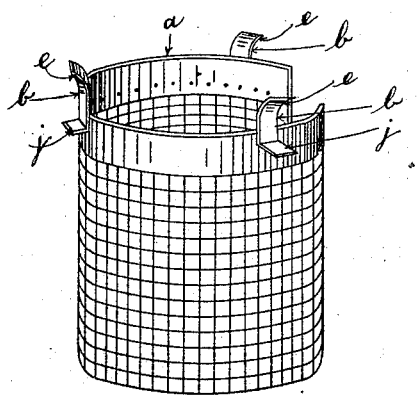

Figure 1 is a sectional elevation of a teapot and strainer arranged according to my invention; Fig. 2, a plan view of the band which carries the strainer; Fig. 3, a perspective view of same.

$a$ is an elastic or flexible band of metal or such like material which is cut so as to permit the diameter of same to be reduced when required.

$b\ b\ b$ are clips attached to or formed integral with the band $a$ and having the curved portions $e$ and parts $j$, which bear upon the rim $c$, formed upon the teapot $d$. The curved portion $e$ bears upon the inclined surface $f$ of the lid $g$. When the lid $g$ is pressed down upon the curved portions $e$ of the clips $b$, the diameter of the band $a$ is decreased and the curved portions $e$ of the clips $b$ enter the annular recesses $h$ in the lid $g$, and by removing the lid $g$ the strainer is also removed from the teapot and may be placed in a suitable support, the teapot being closed by another lid after the container has been removed; or the strainer may be removed from the lid and the lid may then be employed to close the teapot.

The strainer may consist of any well-known form—such as a muslin bag or net—and may be attached to the band $a$ in any well-known and convenient manner.

Having thus described my invention, what I claim, and desire to secure by Letters Patent, is—

In strainers or infusers and teapots for use with same in combination; an elastic band having clips or projections; the strainer or infuser being attached to said band, a rim upon which said projections engage attached to the teapot; an inclined surface and annular recess formed in the lid; the clips engaging in the annular space when the lid is pressed upon same, substantially as described and shown herein.

In testimony that I claim the foregoing I have hereunto set my hand this 8th day of December, 1894.

FRANK WILLIAM BENTALL.

Witnesses:
JAMES FLEMING,
R. C. NICKOL.